United States Patent
Maimone et al.

(10) Patent No.: US 10,942,378 B2
(45) Date of Patent: *Mar. 9, 2021

(54) WAVEGUIDE WITH COHERENT INTERFERENCE MITIGATION

(71) Applicant: Facebook Technologies, LLC, Menlo Park, CA (US)

(72) Inventors: Andrew Maimone, Duvall, WA (US); Andrew Ouderkirk, Redmond, WA (US); Hee Yoon Lee, Redmond, WA (US); Ningfeng Huang, Redmond, WA (US); Maxwell Parsons, Berkeley, CA (US); Scott Charles McEldowney, Redmond, WA (US); Babak Amirsolaimani, Redmond, WA (US); Pasi Saarikko, Kirkland, WA (US); Wanli Chi, Sammamish, WA (US); Giuseppe Calafiore, Redmond, WA (US); Alexander Koshelev, Redmond, WA (US); Barry David Silverstein, Kirkland, WA (US); Lu Lu, Kirkland, WA (US); Wai Sze Tiffany Lam, Redmond, WA (US); Gang Li, Seattle, WA (US); Stephan Lutgen, Dresden (DE); Francois Olivier, Cork (IE); David Massoubre, Cork (IE)

(73) Assignee: FACEBOOK TECHNOLOGIES, LLC, Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/890,607

(22) Filed: Jun. 2, 2020

(65) Prior Publication Data
US 2020/0292851 A1   Sep. 17, 2020

Related U.S. Application Data

(63) Continuation of application No. 16/224,637, filed on Dec. 18, 2018, now Pat. No. 10,705,353.

(51) Int. Cl.
*G02F 1/01*    (2006.01)
*G02B 27/01*   (2006.01)
(Continued)

(52) U.S. Cl.
CPC ....... *G02F 1/0128* (2013.01); *G02B 27/0172* (2013.01); *G02F 1/0134* (2013.01);
(Continued)

(58) Field of Classification Search
CPC ...... G02F 1/0128; G02F 1/0134; G02F 1/065; G02F 1/1326; G02F 1/035; G02F 2201/305; G02B 27/0172; G02B 2027/0123
(Continued)

(56) References Cited

U.S. PATENT DOCUMENTS

| 6,385,358 B1* | 5/2002 | Everett | A61B 1/00177 385/12 |
| 10,705,353 B1* | 7/2020 | Maimone | G02B 6/0038 |

(Continued)

OTHER PUBLICATIONS

PCT/US2019/066775 Search Report dated Mar. 24, 2020.

*Primary Examiner* — Jerry M Blevins
(74) *Attorney, Agent, or Firm* — Pequignot + Myers; Matthew A. Pequignot (57) ABSTRACT

A pupil-replicating waveguide suitable for operation with a coherent light source is disclosed. A waveguide body has opposed surfaces for guiding a beam of image light. An out-coupling element is disposed in an optical path of the beam for out-coupling portions of the beam at a plurality of spaced apart locations along the optical path. Electrodes are coupled to at least a portion of the waveguide body for modulating an optical path length of the optical path of the (Continued)

beam to create time-varying phase delays between the portions of the beam out-coupled by the out-coupling element.

20 Claims, 8 Drawing Sheets

(51) Int. Cl.
*G02F 1/065* (2006.01)
*G02F 1/13* (2006.01)
*G02F 1/035* (2006.01)

(52) U.S. Cl.
CPC ............ *G02F 1/065* (2013.01); *G02F 1/1326* (2013.01); *G02B 2027/0123* (2013.01); *G02F 1/035* (2013.01); *G02F 2201/305* (2013.01)

(58) Field of Classification Search
USPC ............................................................ 385/3
See application file for complete search history.

(56) References Cited

U.S. PATENT DOCUMENTS

| | | | |
|---|---|---|---|
| 2005/0271325 A1* | 12/2005 | Anderson | G02F 1/295 385/40 |
| 2012/0269478 A1* | 10/2012 | Anderson | G02F 1/295 385/3 |
| 2015/0309263 A2 | 10/2015 | Abovitz et al. | |
| 2017/0034435 A1 | 2/2017 | Vallius et al. | |
| 2017/0131551 A1 | 5/2017 | Robbins et al. | |
| 2017/0307893 A1* | 10/2017 | Kooi | G02B 27/0179 |
| 2018/0120563 A1* | 5/2018 | Kollin | G03H 1/2249 |
| 2018/0284884 A1 | 10/2018 | Sulai et al. | |
| 2019/0296218 A1* | 9/2019 | Ouderkirk | H01L 41/09 |

* cited by examiner

WAVEGUIDE WITH COHERENT INTERFERENCE MITIGATION

REFERENCE TO RELATED APPLICATION

The present invention is a continuation of U.S. patent application Ser. No. 16/224,637 filed on Dec. 18, 2018 and incorporated herein by reference in its entirety.

TECHNICAL FIELD

The present disclosure relates to visual displays and display systems, and in particular to wearable displays, components, modules, and related methods.

BACKGROUND

Head-mounted displays (HMDs), near-eye displays (NEDs), and other wearable display systems can be used to present virtual scenery to a user, or to augment real scenery with dynamic information, data, or virtual objects. The virtual or augmented scenery can be three-dimensional (3D) to enhance the experience and to match virtual objects to real objects observed by the user. Eye position and gaze direction, and/or orientation of the user may be tracked in real time, and the displayed scenery may be dynamically adjusted depending on the user's head orientation and gaze direction, to provide a better experience of immersion into a simulated or augmented environment.

Lightweight and compact near-eye displays reduce strain on the user's head and neck, and are generally more comfortable to wear. The optics block of such displays can be the heaviest part of the entire system. Compact planar optical components, such as waveguides, gratings, Fresnel lenses, etc., may be employed to reduce size and weight of an optics block. However, compact planar optics may have limitations related to image quality, exit pupil size and uniformity, pupil swim, field of view of the generated imagery, visual artifacts, etc.

BRIEF DESCRIPTION OF THE DRAWINGS

Exemplary embodiments will now be described in conjunction with the drawings, in which.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. In FIGS. 1 to 4, 5A and 5B, and FIG. 6, similar reference numerals denote similar elements.

Pupil-replicating waveguides are often used in wearable displays due to their compactness and suitability for augmented reality (AR) applications. It may be desirable to use a high coherence light source, such as a laser source, in a wearable display with pupil-replicating waveguide(s). High degree of coherence of light source enables highly efficient beam redirection and delivery. Laser beam scanned displays can have good power efficiency, low cost, compact size, bright color gamut, and may enable resolution scaling. However, in a pupil-replicating waveguide display, each coherently replicated beam has a different optical path length, and therefore a different optical phase. When the eye receives and focuses multiple replicated out-of-phase beams, constructive or destructive interference may result. This causes the intensity of the image to spatially vary in an uncontrollable manner. In accordance with the present disclosure, time-varying phase delays may be imparted on different coherently replicated beams to smooth or average out undesired interference effects. The time-varying phase delays may be created by varying optical path length of the beam propagating along the optical path in the waveguide. The optical path length may be varied by varying physical path length, refractive index, or both.

In accordance with the present disclosure, there is provided a pupil-replicating waveguide comprising a waveguide body having opposed surfaces for guiding a beam of image light therebetween. An out-coupling element is disposed in an optical path of the beam for out-coupling portions of the beam at a plurality of spaced apart locations along the optical path. Electrodes are coupled to at least a portion of the waveguide body for modulating an optical path length of the optical path of the beam to provide time-varying phase delays between the portions of the beam out-coupled by the out-coupling element.

The out-coupling element and one of the electrodes may include a same electrically conductive diffraction grating. The waveguide body may include a substrate for propagating the beam of image light therein, and an electrically responsive layer disposed between the electrodes and configured to modulate the optical path length of the beam upon application of an electrical signal to the electrodes.

In some embodiments, the electrical signal comprises voltage, and the electrically responsive layer comprises an elastic polymer material deformable by an electrostatic attraction force between the electrodes upon application of the voltage. The elastic polymer material may include a nanovoided polymer having a thickness of e.g. between 0.1 micrometers and 20 micrometers. In some embodiments, the electrical signal comprises voltage, and the electrically responsive layer comprises a liquid crystal layer.

In some embodiments, the waveguide body comprises an electro-optic substrate disposed between the electrodes, and the electro-optic substrate has a refractive index responsive to electric field between the electrodes upon application of voltage to the electrodes. The electrode-coupled portion of the waveguide body may include a piezoelectric material for modulating a physical length of the optical path of the beam of image light.

In some embodiments, the waveguide body includes a substrate for propagating the beam of image light therein, and an acoustic actuator coupled to the substrate and comprising an electrically responsive layer between the electrodes. A thickness of the electrically responsive layer is variable by applying an electrical signal to the electrodes. The acoustic actuator may be coupled at a side of the substrate and configured to provide a volume acoustic wave in the substrate. Alternatively, the acoustic actuator may be mechanically coupled to one of the surfaces and configured to provide a surface acoustic wave in that surface.

In accordance with the present disclosure, there is provided a wearable display comprising a light source for providing a beam of image light carrying a plurality of image frames at a frame rate, a pupil-replicating waveguide, and a controller. The pupil-replicating waveguide may include a waveguide body having opposed surfaces for guiding the beam of image light therebetween, an out-coupling element in an optical path of the beam for out-coupling portions of the beam at a plurality of spaced apart locations along the optical path, and electrodes coupled to at least a portion of the waveguide body for modulating an optical path length of the optical path of the beam to create time-varying phase delays between the portions of the beam out-coupled by the out-coupling element. The controller may be operably coupled to the electrodes of the pupil-replicating waveguide and configured to apply an electrical signal to the electrodes to modulate the optical path length.

A rate of modulation of the optical path length may be higher than the frame rate. In embodiments where each image frame comprises a time sequence of frame lines at a line rate higher than the frame rate, the rate of modulation of the optical path length may be higher than the line rate. In embodiments where each frame line comprises a time sequence of line pixels at a pixel rate higher than the line rate, the rate of modulation of the optical path length may be higher than the pixel rate. A rate of modulation of the optical path length may be made to randomly vary relative to a rate at which individual pixels of an image frame are updated.

In accordance with the present disclosure, there is further provided a method for expanding a beam of image light. The method includes propagating the beam along an optical path in a pupil-replicating waveguide, out-coupling, using an out-coupling element in an optical path of the beam, portions of the beam at a plurality of spaced apart locations along the optical path, and modulating, by applying an electrical signal to electrodes coupled to at least a portion of the pupil-replicating waveguide, an optical path length of the optical path of the beam to create time-varying phase delays between the portions of the beam out-coupled by the out-coupling element. In some embodiments, the electrical signal comprises voltage, and the optical path length is modulated using an electrically responsive layer between the electrodes, by applying the voltage thereto. In some embodiments, the beam of image light carries a plurality of image frames at a frame rate, and a rate of modulation of the optical path length is randomly varying relative to the frame rate.

Figure 1:
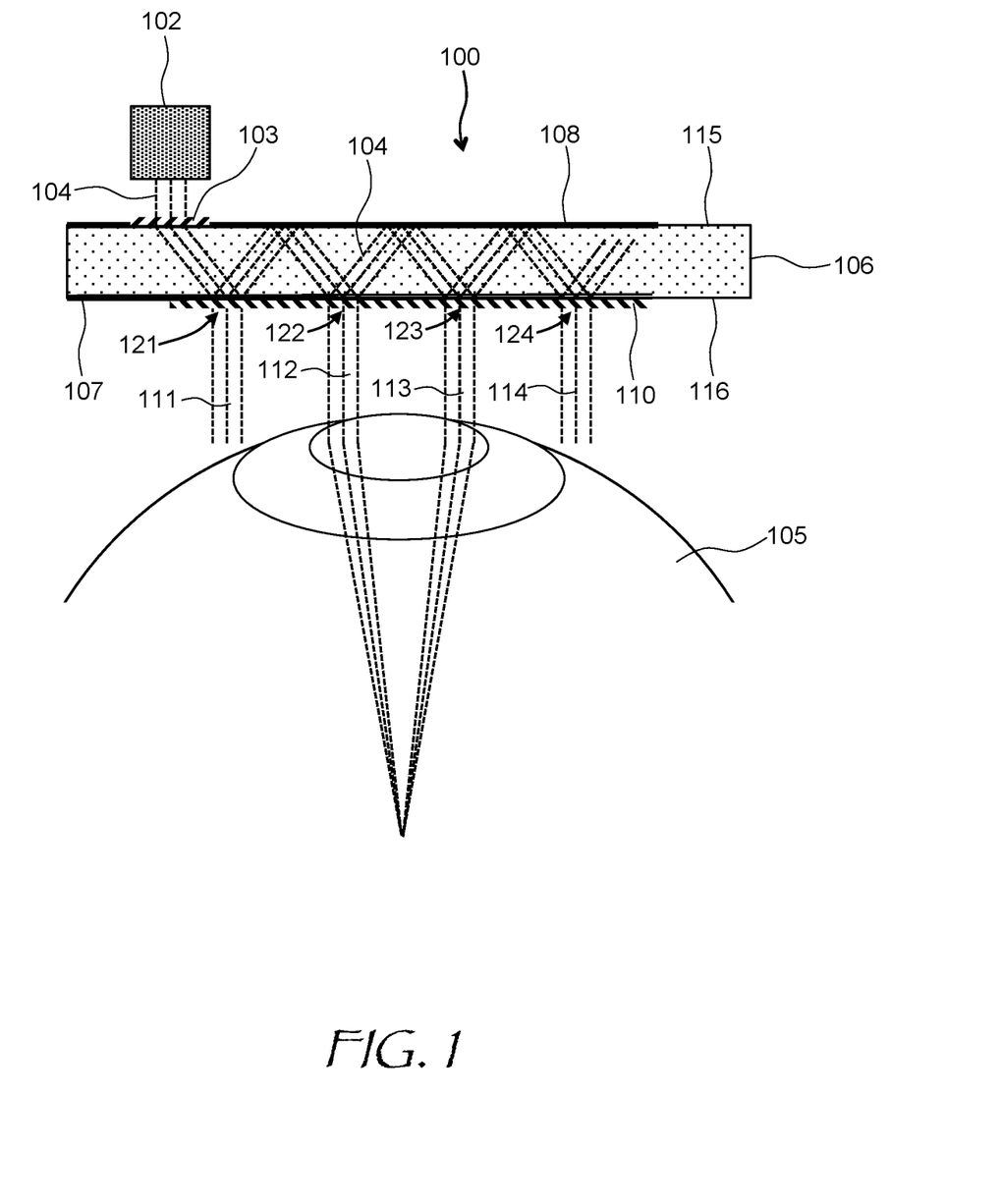
FIG. 1 is a schematic cross-sectional view of a pupil-replicating waveguide of the present disclosure coupled to a coherent light source.

Referring now to FIG. 1, a pupil-replicating waveguide 100 is optically coupled to a coherent light source 102, which provides a cone of beams of image light carrying an image in angular domain to be displayed to an eye 105. Only one beam 104 is shown for brevity; it is to be understood that the image light comprises beams at multiple angles within a field of view observable by the eye 105. An in-coupler 103, e.g. a diffraction grating, may be provided to in-couple the beam 104 for propagation in a waveguide body 106 of the pupil-replicating waveguide. The waveguide body 106 has opposed top 115 and bottom 116 surfaces for guiding the beam 104 between the surfaces 115,116 by reflection, e.g. total internal reflection (TIR), from the surfaces 115,116. An out-coupling element 110 such as a surface-relief diffraction grating, a volume Bragg grating (VBG), a hologram, etc., can be disposed in an optical path of the beam 104 for out-coupling portions 111,112,113,114 of the beam 104 at a plurality of spaced apart locations 121,122,123,124 along the optical path. Electrodes 107,108 can be coupled to at least a portion of the waveguide body 106 for modulating optical path length of the optical path of the beam 104 to create time-varying phase delays between the portions 111, 112,113,114 of the beam 104 out-coupled by the out-coupling element 110. It is noted that, although the out-coupling element 110 is shown in FIG. 1 on the outside, that is, supported by the bottom electrode 107, the order, i.e. relative position, of the out-coupling element 110 and the bottom electrode 107 may be reversed.

The electrodes 107,108 can modify some property of at least a portion of the waveguide body 106, e.g. geometrical dimensions, index of refraction, etc., via a suitable mechanism such as electro-optic effect, piezo effect, thermo-optic effect, magneto-optic effect, acousto-optic effect, photoelasticity, etc., to modulate the optical path length of the beam 104 to modulate, i.e. vary in time domain, optical path difference between the different beam portions 111,112,113, 114. When the optical path length difference is varied, the interference effects between the different beam portions 111,112,113,114 wash out, i.e. are averaged out, reducing or even completely eliminating undesirable spatial modulation of optical power density of the image to be displayed.

To employ an electro-optic effect, such as Pockels or Kerr effect, the waveguide body 106 may include an electro-optic substrate between the electrodes 107,108. The electro-optic substrate may have a refractive index responsive to electric field between the electrodes 107,108 generated by applying a voltage (i.e. electric potential difference) to the electrodes 107,108. The electro-optic substrate may be made of lithium niobate, for example. To employ piezo effect, the waveguide body 106 may be made of a transparent material exhibiting a piezo effect, e.g. a suitable crystal such as quartz, lithium tantalate, lithium niobate, etc. When the waveguide body 106 is made out of a transparent piezoelectric material, a physical length of the waveguide body 106 changes upon application of the voltage to the electrodes 107,108, which causes the optical path length change of the beam 104. In some embodiments, the diffraction grating 110 may be made conductive, and thus serve as one of the electrodes, e.g. the electrode 107. In other words, the diffraction grating 110 may combine the functions of the out-coupling element and one of the electrodes.

Figure 2:
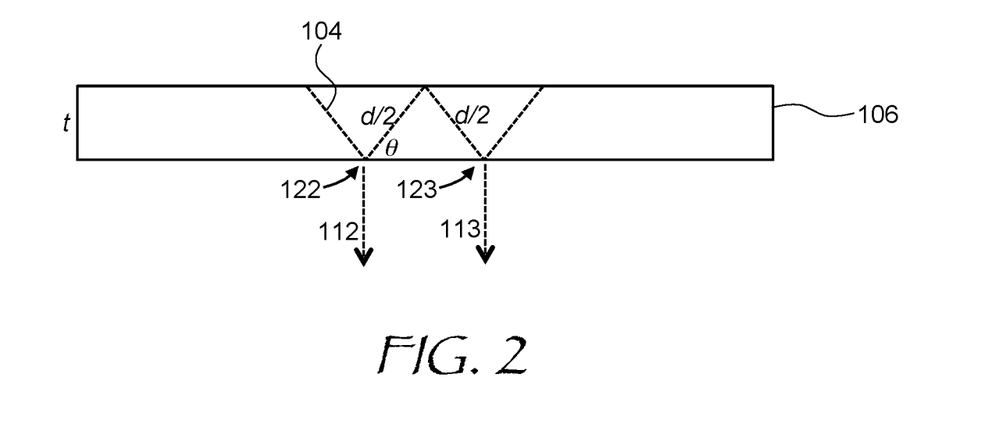
FIG. 2 is a side cross-sectional view of the pupil-replicating waveguide of FIG. 1 showing optical path length difference between out-coupled portions of the beam.

Referring to FIG. 2, an optical path length difference d between two 112,113 of the out-coupled portions of the beam 104 is further illustrated. The waveguide body 106 has a refractive index n and thickness t, and the beam 104 propagates in the waveguide body 106 at an angle θ. The optical path length difference d consists of two equal halves d/2, as shown, each half d/2=nt/sin θ and the optical phase difference φ accordingly is $$\phi = 4\pi nt/(\lambda \sin \theta) \qquad (1)$$

where λ is the wavelength of the beam 104.

For a given angle θ and wavelength λ, one can change the relative phase shift by varying thickness t, refractive index n, or both. At a reasonable waveguide body 106 thickness, e.g. 1-2 mm, refractive index of 1.5-2.2, and angles θ, e.g. 40-65 degrees, very small changes in thickness (tens of nanometers) or refractive index n (of the order of $10^{-5}$) are required to produce the maximum phase difference amplitude of π. When relative phases of the beam portions 122,123 change, different interference patterns will result. By changing the phase difference φ rapidly over time, one can visually average out interference effects. For example, one may sweep phase difference φ over the π magnitude between between adjacent replicated beam portions 111,112, 113,114 at a rate comparable to, or higher than, the frame rate of the light source 102 (FIG. 1).

Figure 3:
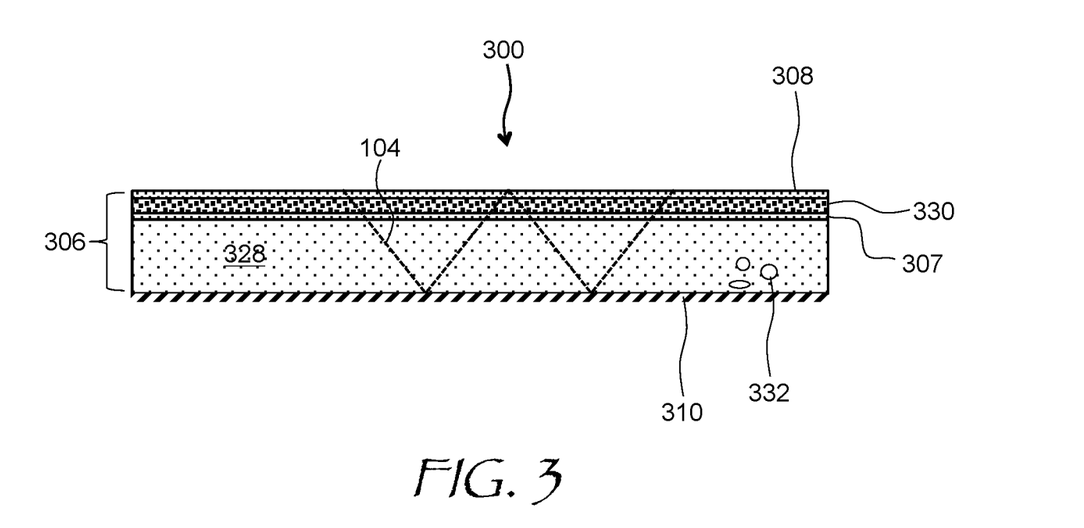
FIG. 3 is a side cross-sectional view of a pupil-replicating waveguide including a nanovoided electroactive polymer layer.

Referring now to FIG. 3, a pupil-replicating waveguide 300 of the present disclosure includes a waveguide body 306 having two portions: a substrate 328 for propagating the beam 104, and a thin electrically responsive layer 330 disposed between electrodes 307,308. An out-coupling diffraction grating 310 is disposed on the opposite side of the substrate 328 as the electrically responsive layer 330. The out-coupling diffraction grating 310 may also be disposed on a same side of the substrate 328 as the electrically responsive layer 330. The electrically responsive layer 330 can be configured to modulate the optical path length of the beam 104 upon application of an electrical signal, such as electric current (when the electrically responsive layer responds to electric current) or voltage, i.e. difference of electric potentials (when the electrically responsive layer responds to electric field), to the electrodes 307,308. Herein, the term "electrically responsive layer" means a layer having a thickness or an optical thickness (the thickness multiplied by refractive index) dependent on the electrical signal. One advantage is that electrically responsive materials exist which create a large change in optical path length with moderate voltages, increasing the magnitude of the corresponding optical response of the electrically responsive layer 330.

In some embodiments of the present disclosure, the electrically responsive layer 330 includes an electroactive polymer material, that is, a polymer material that may change its size or shape in the presence of an electric field, thus changing the optical path length within the material. One type of electroactive polymers is dielectric electroactive polymer, which is an elastic polymer material deformable by an electrostatic attraction force between the electrodes when the voltage is applied to the electrodes. Other types of suitable electroactive polymers may be used, including e.g. ferroelectric electroactive polymers which maintain a permanent electric polarization that can be reversed or switched by an external electric field.

One drawback of a dielectric polymer is a comparatively large actuation voltage. In accordance with the present disclosure, the actuation voltage of a dielectric polymer of the electrically responsive layer 330 may be reduced by providing a plurality of voids 332 throughout the dielectric polymer material. Only several voids 332 are shown in FIG. 3 for brevity. The voids 332 may be approximately 7 nm to 70 nm in size and may occupy between 10% and 90% of the polymer volume, or, in another embodiment, between 30% and 70% of the polymer volume. The thickness of the electrically responsive layer 330 comprising a nanovoided dielectric polymer may be between 0.1 micrometers and 20 micrometers, for example. The presence of the voids 332 improves electromechanical response of the polymer layer and considerably reduces the required maximum driving voltage. As low voltage as 3-5V may be enough to produce a significant phase difference (e.g., π) between the replicated beam portions in the nanovoided polymer material. The driving voltage range may accordingly be 0V-3V; 0V-5V; 0V-12V; or in some embodiments, 0V to 30V. In some embodiments, the diffraction grating 310 may be disposed not on an opposite side as shown in FIG. 3 but on a same side of the substrate 328 as the electrically responsive layer 330, e.g. resting on the top electrode 308, for example. In some embodiments, the diffraction grating 310 may be made out of a conductive material and therefore may act as one of the electrodes 307,308.

Figure 4:
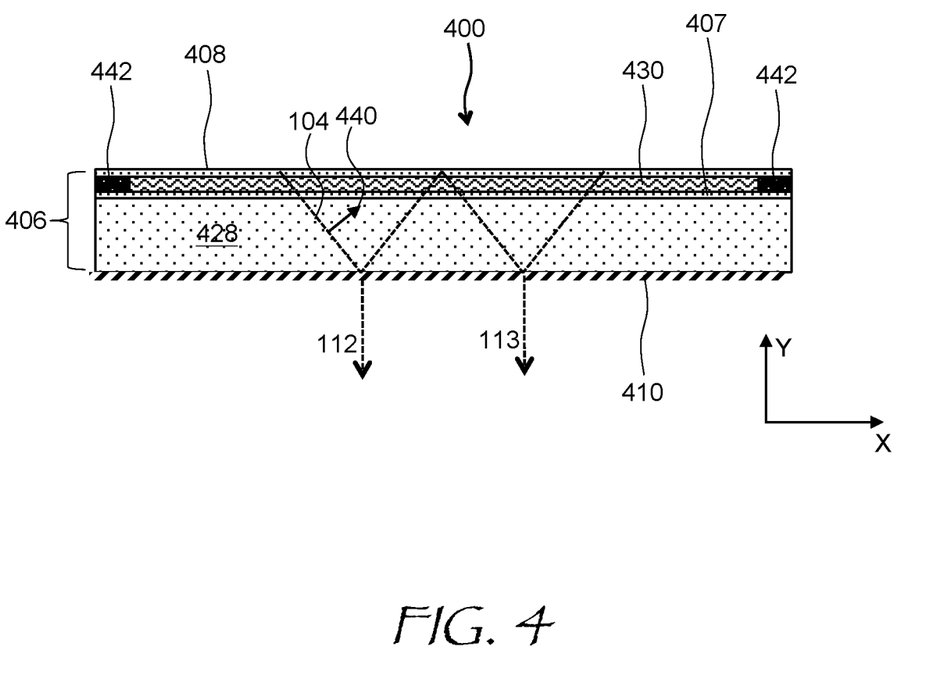
FIG. 4 is a side cross-sectional view of a pupil-replicating waveguide including a liquid crystal layer.

Turning to FIG. 4, a pupil-replicating waveguide 400 of the present disclosure includes a waveguide body 406 having two portions, a substrate 428 for propagating the beam 104, and a liquid crystal layer 430 disposed between electrodes 407,408. An out-coupling diffraction grating 410 is disposed on the opposite side of the substrate 428 from the liquid crystal layer 330. The out-coupling diffraction grating 410 may also be disposed on a same side of the substrate 428 as the liquid crystal layer 430. Upon application of voltage, i.e. a difference of electric potentials, between the electrodes 307,308, liquid crystal molecules change their orientation e.g. due to dipole interaction with the resulting electric field, thereby changing birefringence of the liquid crystal layer 430. In one embodiment, the liquid crystal molecules are oriented generally in X-direction, by corresponding alignment layers, not shown. The optical beam 104 is linearly polarized such that it generally propagates in the XY plane as shown at 440. Upon application of voltage between the electrodes 407,408, the liquid crystal molecules become predominantly oriented in the direction of the electric field, that is, in Y-direction. In such example configuration, the changed birefringence will result in a corresponding change of the optical phase of the optical beam 104, creating optical phase variations between beam portions 112,113. Different types of crystal layer materials and configurations may be used including without limitation nematic, cholesteric, or ferroelectric liquid crystals. Spacer-filled gasket 442 may be provided to seal the liquid crystal layer 430 and define the thickness of the liquid crystal layer 430. In some embodiments, a ferroelectric liquid crystal material may be used due to sub-millisecond switching speed of ferroelectric liquid crystals.

Figure 5A:
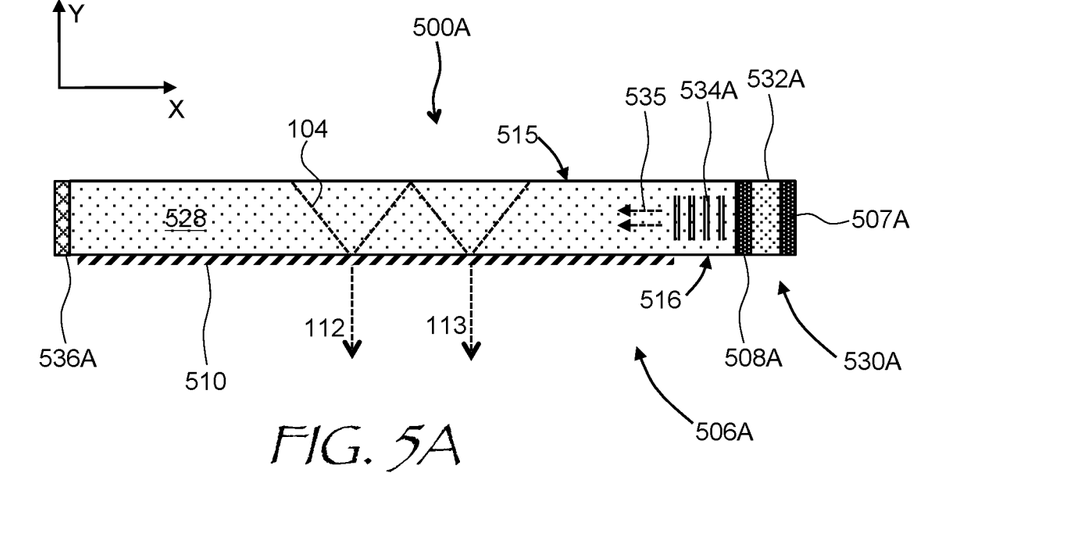
FIG. 5A is a side cross-sectional view of a pupil-replicating waveguide including an acoustic actuator for creating a volume acoustic wave in the pupil-replicating waveguide.

Referring to FIG. 5A, a pupil-replicating waveguide 500A of the present disclosure includes a waveguide body 506A having two portions, a substrate 528 for propagating the beam 104, and a volume-wave acoustic actuator 530A mechanically coupled at a side of the substrate 528 joining its top 515 and bottom 516 reflective surfaces. A diffraction grating 510 out-couples the portions 112,113 of the beam 104. In the embodiment shown, the volume-wave acoustic actuator 530A includes an electrically responsive layer 532A, e.g. a piezoelectric layer, disposed between electrodes 507A,508A. In operation, an electrical signal at a high frequency, typically in the range of 1 MHz to 100 MHz or higher, is applied to the electrodes 507A,508A causing the electrically responsive layer 532A to oscillate, typically at a frequency of a mechanical resonance of the electrically responsive layer 532A. The oscillating thickness of the electrically responsive layer 532A creates a volume acoustic wave 534A propagating in the substrate 528 in a direction 535, i.e. along the X-axis. The volume acoustic wave 534A modulates optical path length by changing the substrate 528 index of refraction due to the effect of photoelasticity, the geometrical shape of the substrate 528, or both. In some embodiments, an acoustic wave terminator 536A can be coupled to an opposite side of the substrate 528 to absorb the volume acoustic wave 534A and thus prevent a standing acoustic wave formation in the substrate 528. A standing volume acoustic wave may be undesirable in that it may create distortions in the image being carried by the beam 104 towards a user's eye.

Figure 5B:
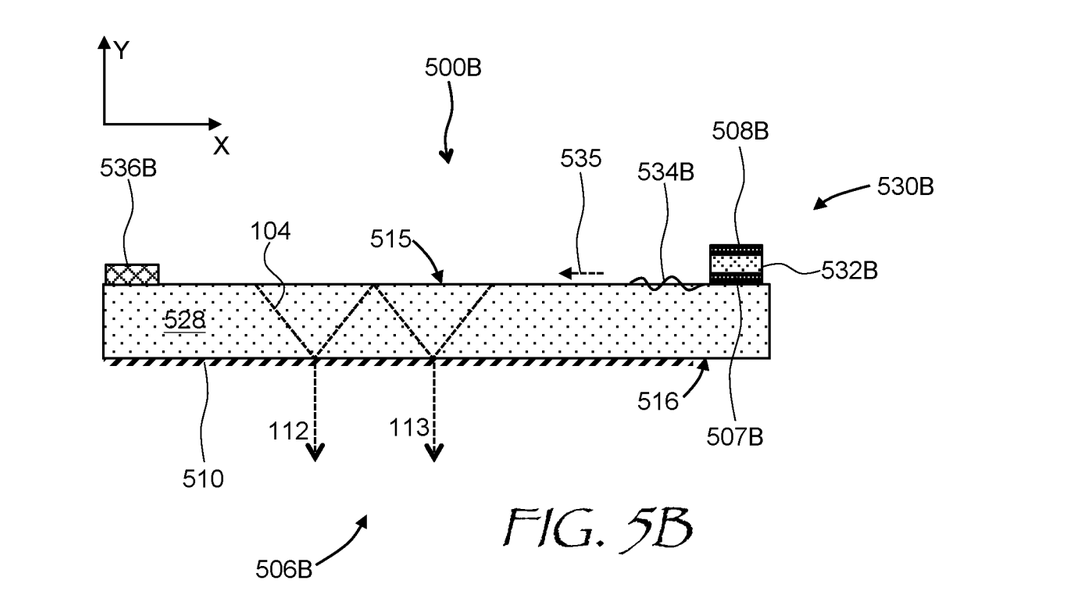
FIG. 5B is a side cross-sectional view of a pupil-replicating waveguide including an acoustic actuator for creating a surface acoustic wave in the pupil-replicating waveguide.

Turning to FIG. 5B, a pupil-replicating waveguide 500B of the present disclosure includes a waveguide body 506B having two portions, the substrate 528 for propagating the beam 104, and a surface-wave acoustic actuator 530B mechanically coupled at the top reflective surface 515. Alternatively, the surface-wave acoustic actuator 530B may also be coupled at the bottom reflective surface 516. In the embodiment shown, the surface-wave acoustic actuator 530B includes an electrically responsive layer 532B, e.g. a piezoelectric layer, disposed between electrodes 507B, 508B. In operation, an electrical signal at a high frequency, typically in the range of 1 MHz to 100 MHz or higher, is applied to the electrodes 507B,508B causing the electrically responsive layer 532B to oscillate. The oscillation of the electrically responsive layer 532A creates a surface acoustic wave 534B propagating in the substrate 528 in the direction 535, i.e. along the X-axis. The surface acoustic wave 534B modulates optical path length by changing the substrate 528 index of refraction due to the effect of photoelasticity, the geometrical shape of the substrate 528, or both. When the index of refraction or the geometrical shape or size of the substrate are changed, the optical path length of the beam 104 changes. In some embodiments, an acoustic wave terminator 536B can be coupled to an opposite side of the substrate 528 at the same surface, i.e. at the top surface 515 in FIG. 5B, to absorb the surface acoustic wave 534B and thus prevent a standing acoustic wave formation. A standing surface acoustic wave may be undesirable in that it may create distortions in the image being carried by the beam 104 towards a user's eye.

Figure 6:
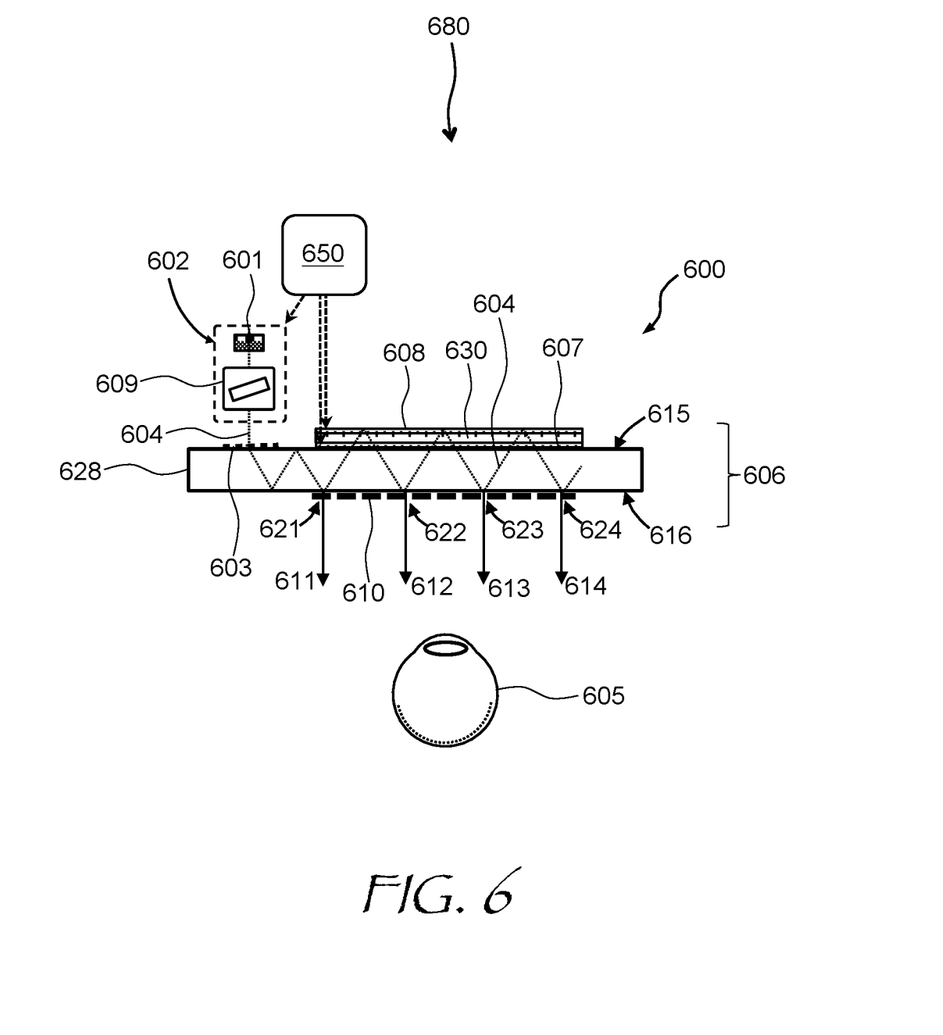
FIG. 6 is a side cross-sectional view of a wearable display of the present disclosure.

Referring now to FIG. 6, a wearable display 680, e.g. a near-eye display (NED) or a head-mounted display (HMD), includes a light source 602 providing a beam 604 of image light carrying a plurality of image frames to be displayed to a user's eye 605 at a fixed or variable frame rate. In the embodiment shown, the light source 602 includes a linear laser diode array 601 optically coupled to a linear scanner 609. Each image frame may include a time sequence of frame lines generated by the linear laser diode array 601, which are shifted by the linear scanner 609 in synchronism with the generated lines of the image to form an image frame line by line, at a line rate N times higher than the frame rate, where N is the number of lines in a frame being generated. A single laser diode light source coupled to a two-dimensional scanner for scanning the beam 604 in X and Y planes may also be used. For the single scanned laser diode source, each frame line includes a time sequence of line pixels at a pixel rate higher than the line rate. The line rate is the frequency of a scanning line, e.g. in X plane, and the frame rate is the frequency of the scanning in Y plane.

A pupil-replicating waveguide 600 includes a waveguide body 606 including a substrate 628 having opposed top 615 and bottom 616 surfaces for guiding the beam 604 between the surfaces 615,616 by reflection, e.g. TIR, from the surfaces 615,616, and an electrically responsive layer 630. The beam 604 may be coupled into the waveguide body 606 by using a grating coupler 603, for example. Using TIR for guiding the beam 604 in the waveguide body 606 has an advantage of allowing an external light at angles less than a TIR critical angle to be transmitted through the surfaces 615,616. Any of the above described pupil-replicating waveguides, i.e. the pupil-replicating waveguide 100 of FIG. 1, the pupil-replicating waveguide 300 of FIG. 3, the pupil-replicating waveguide 400 of FIG. 4, the pupil-replicating waveguide 500A of FIG. 5A, or the pupil-replicating waveguide 500B of FIG. 5B may be used. An out-coupling element 610, such as a surface-relief diffraction grating, a volume Bragg grating (VBG), a hologram, etc., may be disposed in the optical path of the beam 604 at any one of the surfaces 615,616, or inside a substrate 628, for out-coupling portions 611,612,613,614 of the beam 604 at a plurality of spaced apart locations 621,622,623,624 along the optical path.

Electrodes 607,608 may be coupled to the waveguide 600, or to an electrically responsive layer 630 of the waveguide 600. The electrically responsive layer 630 may include e.g. the nanovoided elastic polymer layer 330 of FIG. 3 or the liquid crystal layer 430 of FIG. 4. The electrodes 607,608 convey an electrical signal, e.g. electrical current or voltage, to the electrically responsive layer 630 for modulating an optical path length of the optical path of the beam 604 to create time-varying phase delays between the portions 611, 612,613,614 of the beam 604 out-coupled by the out-coupling element 610. A controller 650 can be operably coupled to the electrodes 607,608 of and configured to apply the electrical signal to the electrodes 607,608 to modulate the optical path length. The controller 650 may also be coupled to the light source 602 for providing image frames to be displayed.

The controller 650 may be configured to have a rate of modulation of the optical path length rate to be higher than the frame rate, such that any optical power density non-uniformities due to interference between different beam portions 611-614 may be averaged out in a single frame. For embodiments where the light source 602 includes the linear diode array 601 coupled to a linear scanner 609, the controller 650 may be configured to have the rate of modulation of the optical path length rate to be higher than the line rate, such that any optical power density non-uniformities due to interference between different beam portions 611-614 may be averaged out in each image line. For embodiments where a single diode laser light source is scanned in two dimensions, e.g. in X and Y planes, the controller 650 may be configured to have the rate of modulation of the optical path length higher than the pixel rate. It may also be preferable to configure the controller 650 such that the rate of modulation of the optical path length is randomly varying relative to the frame rate, or relative to a rate at which individual pixels of an image frame are updated. In other words, the phase delays of the beam portions 611-614 may be made random relative to the time intervals when frames, lines, and/or individual pixels of the image are being updated. This may prevent the interference-caused image non-uniformity patterns from staying steady or drifting across image frames.

Figure 7:
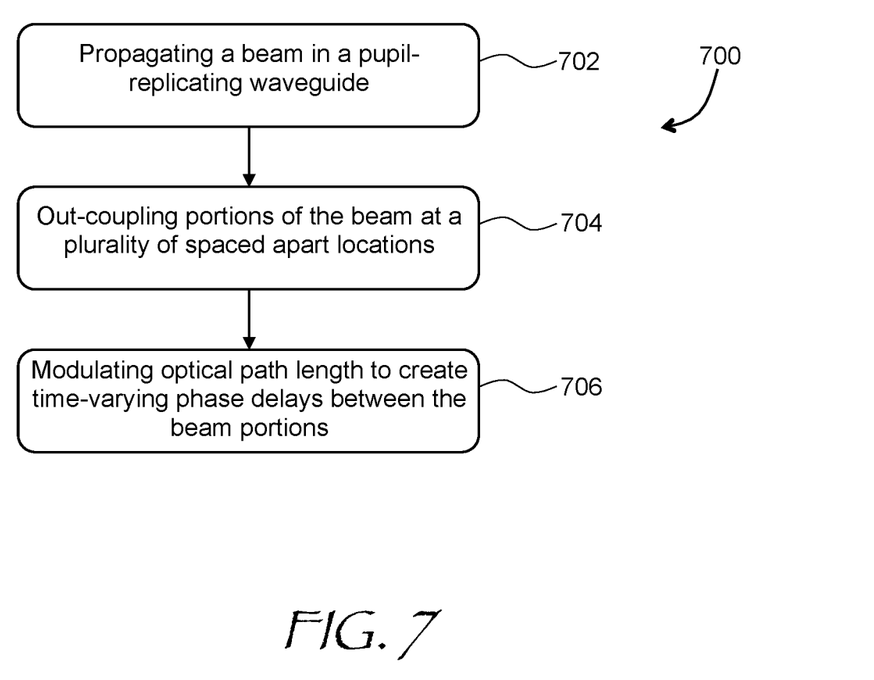
FIG. 7 is a flow chart of a method for expanding a beam of image light.

Referring now to FIG. 7, a method 700 for expanding a beam of image light includes propagating (702) the beam along an optical path in a pupil-replicating waveguide. Portions of the beam are out-coupled (704) using an out-coupling element in an optical path of the beam at a plurality of spaced apart locations along the optical path. Optical path length of the optical path of the beam is then modulated (706) by applying an electrical signal to electrodes coupled to at least a portion of the waveguide, to create time-varying phase delays between the portions of the beam out-coupled by the out-coupling element. The modulated optical path length causes interference patterns of the out-coupled beam portions to shift, effectively washing them out, or averaging them. This enables one to use a coherent light source, which may be well-collimated and may be easier to work with.

In some embodiments of the method 700, the rate of modulation of the optical path length is randomly varying relative to the frame rate of the images displayed, to prevent any noticeable steady or drifting interference patterns from appearing. The optical path length modulation may be carried out using any of the devices/technologies described above, e.g. using an electrically responsive layer between the electrodes, such as a nanovoided polymer, a liquid crystal layer, a piezo element, etc.

Figure 8A:
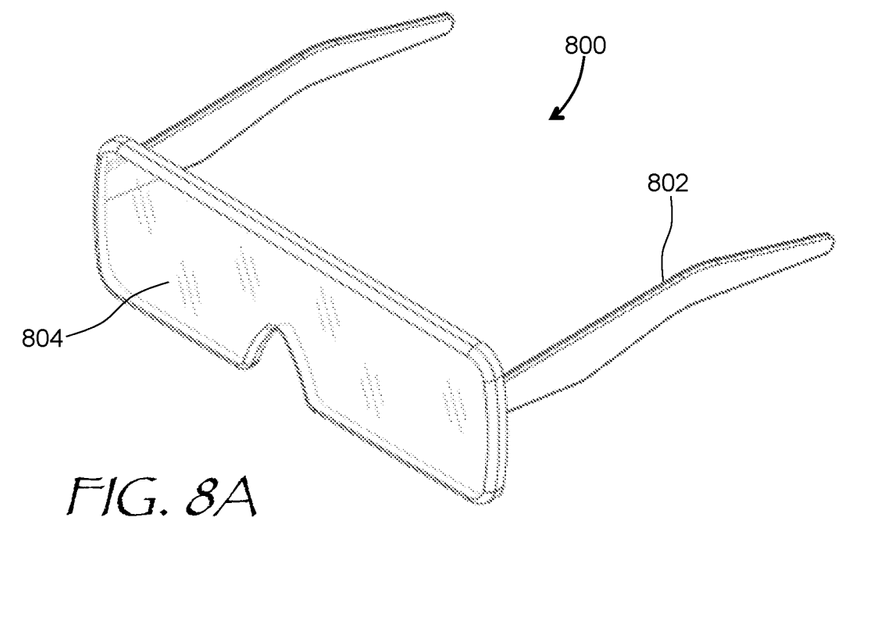
FIG. 8A is an isometric view of an eyeglasses form factor near-eye augmented reality (AR)/virtual reality (VR) display incorporating a pupil-replicating waveguide of the present disclosure.
Figure 8B:
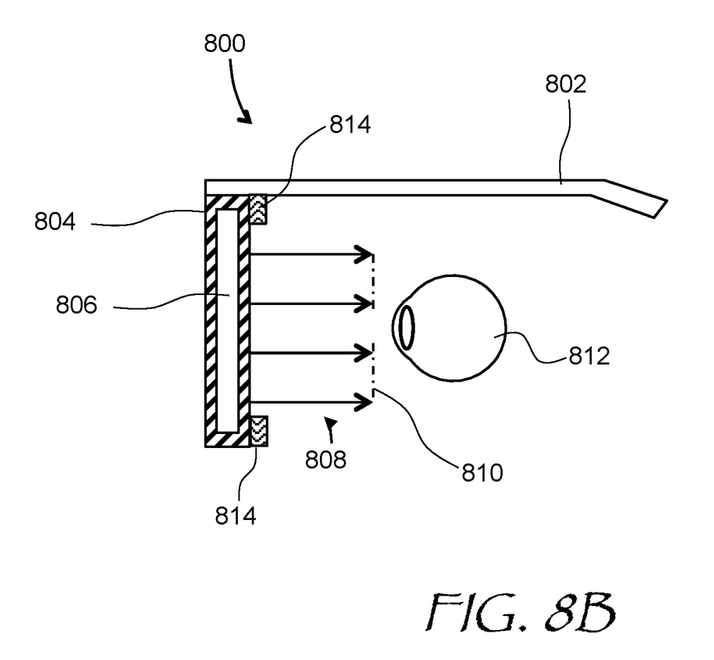
FIG. 8B is a side cross-sectional view of the AR/VR display of FIG. 8A.

Referring to FIGS. 8A and 8B, a near-eye AR/VR display 800 is an embodiment of the wearable display 680 of FIG. 6, and may include the pupil-replicating waveguide 100 of FIG. 1, the pupil-replicating waveguide 300 of FIG. 3, the pupil-replicating waveguide 400 of FIG. 4, the pupil-replicating waveguide 500A of FIG. 5A, and/or the pupil-replicating waveguide 500B of FIG. 5B. A body or frame 802 of the near-eye AR/VR display 800 has a form factor of a pair of eyeglasses, as shown. A display 804 includes a display assembly 806 (FIG. 8B), which provides image light 808 to an eyebox 810, i.e. a geometrical area where a good-quality image may be presented to a user's eye 812. The display assembly 806 may include a separate coherent-replication VR/AR display module for each eye, or one coherent-replication VR/AR display module for both eyes. For the latter case, an optical switching device may be coupled to a single electronic display for directing images to the left and right eyes of the user in a time-sequential manner, one frame for left eye and one frame for right eye. The images are presented fast enough, i.e. with a fast enough frame rate, that the individual eyes do not notice the flicker and perceive smooth, steady images of surrounding virtual or augmented scenery.

An electronic display of the display assembly 806 may include, for example and without limitation, a liquid crystal display (LCD), a Liquid Crystal on Silicon (LCoS) display, a scanned laser beam display, a scanned laser beam array, a phased array display, a holographic display, or a combination thereof. The near-eye AR/VR display 800 may also include an eye-tracking system 814 for determining, in real time, the gaze direction and/or the vergence angle of the user's eyes 812. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, dynamically creating additional objects or pointers, etc. Furthermore, the near-eye coherent AR/VR display 800 may include an audio system, such as small speakers or headphones.

Figure 9:
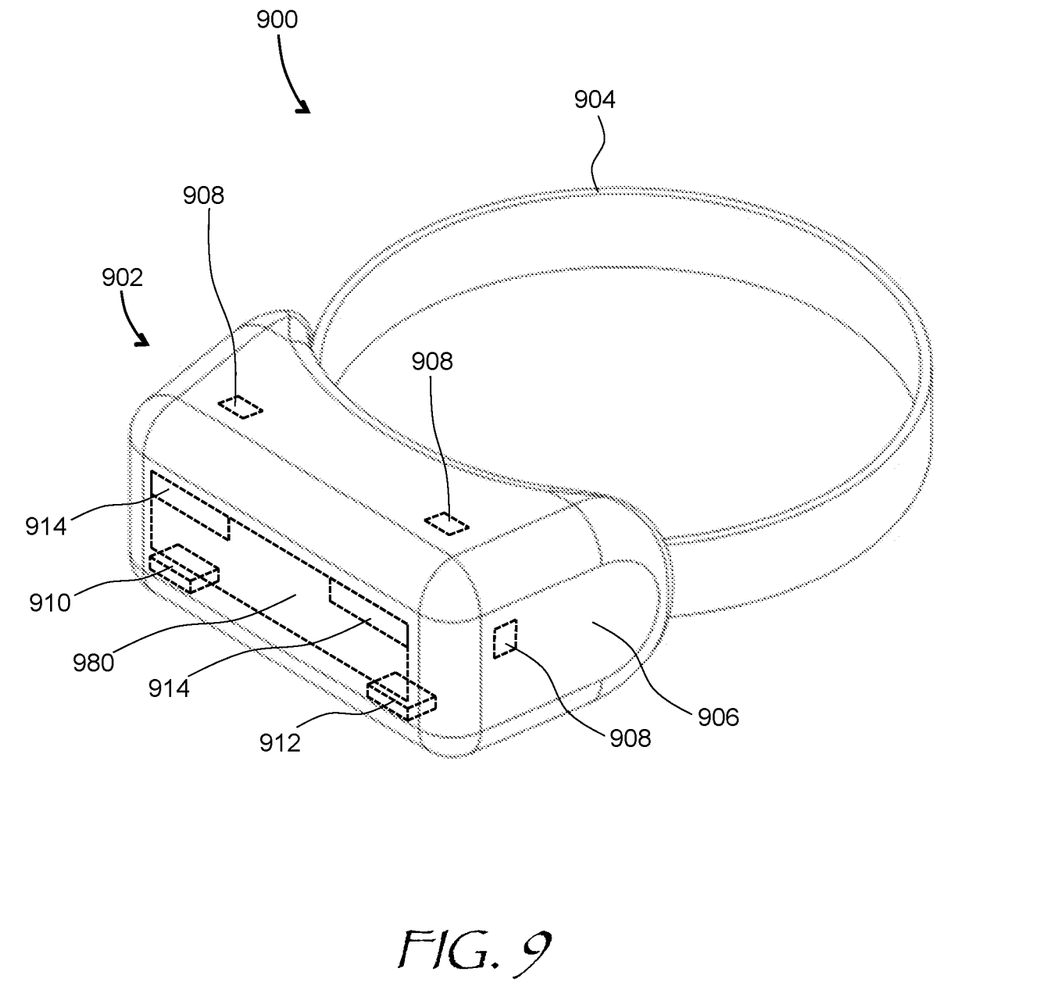
FIG. 9 is an isometric view of a head-mounted display (HMD) incorporating a pupil-replicating waveguide of the present disclosure.

Turning now to FIG. 9, an HMD 900 is an example of an AR/VR wearable display system enclosing user's eyes for a greater degree of immersion into the AR/VR environment. The HMD 900 may be a part of an AR/VR system including a user position and orientation tracking system, an external camera, a gesture recognition system, control means for providing user input and controls to the system, and a central console for storing software programs and other data for interacting with the user for interacting with the AR/VR environment. The functional purpose of the HMD 900 is to augment views of a physical, real-world environment with computer-generated imagery, and/or to generate entirely virtual 3D imagery. The HMD 900 may include a front body 902 and a band 904. The front body 902 is configured for placement in front of eyes of the user in a reliable and comfortable manner, and the band 904 may be stretched to secure the front body 902 on the user's head. A display system 980 may include any of the waveguide assemblies described herein. The display system 980 may be disposed in the front body 902 for presenting AR/VR images to the user. Sides 906 of the front body 902 may be opaque or transparent.

In some embodiments, the front body 902 includes locators 908, an inertial measurement unit (IMU) 910 for tracking acceleration of the HMD 900 in real time, and position sensors 912 for tracking position of the HMD 900 in real time. The locators 908 may be traced by an external imaging device of a virtual reality system, such that the virtual reality system can track the location and orientation of the HMD 900 in real time. Information generated by the IMU and the position sensors 912 may be compared with the position and orientation obtained by tracking the locators 908, for improved tracking of position and orientation of the HMD 900. Accurate position and orientation is important for presenting appropriate virtual scenery to the user as the latter moves and turns in 3D space.

The HMD 900 may further include an eye tracking system 914, which determines orientation and position of user's eyes in real time. The obtained position and orientation of the eyes allows the HMD 900 to determine the gaze direction of the user and to adjust the image generated by the display system 980 accordingly. In one embodiment, the vergence, that is, the convergence angle of the user's eyes gaze, is determined. The determined gaze direction and vergence angle may be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 902.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A waveguide comprising:
a waveguide body for guiding a beam of image light;
an out-coupling element in an optical path of the beam for out-coupling a plurality of portions of the beam at a plurality of spaced apart locations along the optical path; and
electrodes coupled to at least a portion of the waveguide body for modulating an optical path length of the optical path of the beam to provide time-varying phase delays between different portions of the plurality of portions of the beam out-coupled by the out-coupling element.

2. The waveguide of claim 1, wherein the out-coupling element and one of the electrodes comprise a same electrically conductive diffraction grating.

3. The waveguide of claim 1, wherein the waveguide body comprises: a substrate for propagating the beam of image light therein; and
an electrically responsive layer disposed between the electrodes and configured to modulate the optical path length of the beam upon application of an electrical signal to the electrodes.

4. The waveguide of claim 3, wherein the electrical signal comprises voltage, and wherein the electrically responsive layer comprises an elastic polymer material deformable by an electrostatic attraction force between the electrodes upon application of the voltage.

5. The waveguide of claim 4, wherein the elastic polymer material comprises a nanovoided polymer.

6. The waveguide of claim 5, wherein the nanovoided polymer has a thickness of between 0.1 micrometers and 20 micrometers.

7. The waveguide of claim 3, wherein the electrical signal comprises voltage, and wherein the electrically responsive layer comprises a liquid crystal layer.

8. The waveguide of claim 1, wherein the waveguide body comprises an electro-optic substrate disposed between the electrodes, and wherein the electro-optic substrate has a refractive index responsive to electric field between the electrodes upon application of voltage thereto.

9. The waveguide of claim 8, wherein the at least a portion of the waveguide body comprises a piezoelectric material for modulating a physical length of the optical path of the beam of image light.

10. The waveguide of claim 1, wherein the waveguide body comprises:
a substrate for propagating the beam of image light therein; and
an acoustic actuator coupled to the substrate and comprising an electrically responsive layer between the electrodes, wherein a thickness of the electrically responsive layer is variable by applying an electrical signal to the electrodes.

11. The waveguide of claim 10, wherein the acoustic actuator is coupled at a side of the substrate and configured to provide a volume acoustic wave in the substrate.

12. The waveguide of claim 10, wherein the waveguide body comprises opposed surfaces for guiding the beam of image light therebetween, wherein the acoustic actuator is mechanically coupled to one of the surfaces and configured to provide a surface acoustic wave in that surface.

13. A display device comprising:
a light source for providing a beam of image light carrying a plurality of image frames at a frame rate;
a waveguide comprising: a waveguide body for guiding the beam of image light;
an out-coupling element in an optical path of the beam for out-coupling a plurality of portions of the beam at a plurality of spaced apart locations along the optical path; and
electrodes coupled to at least a portion of the waveguide body for modulating an optical path length of the optical path of the beam to create time-varying phase delays between different portions of the plurality of portions of the beam out-coupled by the out-coupling element; and
a controller operably coupled to the electrodes of the waveguide and configured to apply an electrical signal to the electrodes to modulate the optical path length.

14. The display device of claim 13, wherein a rate of modulation of the optical path length is higher than the frame rate.

15. The display device of claim 14, wherein each image frame comprises a time sequence of frame lines at a line rate higher than the frame rate, and wherein the rate of modulation of the optical path length is higher than the line rate.

16. The display device of claim 14, wherein each frame line comprises a time sequence of line pixels at a pixel rate higher than the line rate, and wherein the rate of modulation of the optical path length is higher than the pixel rate.

17. The display device of claim 14, wherein a rate of modulation of the optical path length is randomly varying relative to a rate at which individual pixels of an image frame are updated.

18. A method for expanding a beam of image light, the method comprising:
propagating the beam along an optical path in a waveguide;
out-coupling, using an out-coupling element in an optical path of the beam, a plurality of portions of the beam at a plurality of spaced apart locations along the optical path; and
modulating, by applying an electrical signal to electrodes coupled to at least a portion of the waveguide, an optical path length of the optical path of the beam to create time-varying phase delays between different portions of the plurality of portions of the beam out-coupled by the out-coupling element.

19. The method of claim 18, wherein the electrical signal comprises voltage, and wherein the optical path length is modulated using an electrically responsive layer between the electrodes, by applying the voltage thereto.

20. The method of claim 18, wherein the beam of image light carries a plurality of image frames at a frame rate, and wherein a rate of modulation of the optical path length is randomly varying relative to the frame rate.

* * * * *